United States Patent [19]

Campbell et al.

[11] 4,365,004

[45] Dec. 21, 1982

[54] METALLIC CORE PANEL AND METHOD OF MAKING SAME

[75] Inventors: James R. Campbell, South Laguna; Roy L. Anspach, Anaheim, both of Calif.

[73] Assignees: Thomas P. Mahoney; Donald A. Ruston, both of Balboa Island, Calif.

[21] Appl. No.: 227,654

[22] Filed: Jan. 23, 1981

Related U.S. Application Data

[62] Division of Ser. No. 948,012, Oct. 2, 1978, Pat. No. 4,254,188.

[51] Int. Cl.³ .......................... B23P 3/00; B32B 3/06
[52] U.S. Cl. .................................. 428/593; 428/594; 219/78.12; 52/800; 52/806
[58] Field of Search ............................. 428/593, 594; 219/78.12; 52/800, 806

[56] References Cited

U.S. PATENT DOCUMENTS

| | | | |
|---|---|---|---|
| 2,108,795 | 2/1938 | Budd | 52/800 |
| 2,820,882 | 1/1958 | Johnson | 219/78.12 |
| 2,876,333 | 3/1959 | Argentin | 219/78.12 |
| 2,959,257 | 11/1960 | Campbell | 52/806 |
| 2,983,038 | 5/1961 | Johnson | 52/806 |
| 3,005,086 | 10/1961 | Watter | 219/78.12 |
| 3,057,057 | 10/1962 | Langhans | 52/806 |
| 3,084,770 | 4/1963 | Wirsing | 52/806 |
| 3,156,041 | 11/1964 | Gault | 52/800 |
| 3,612,813 | 10/1971 | Gerath | 219/78.12 |

*Primary Examiner*—James Poer
*Attorney, Agent, or Firm*—Mahoney & Schick

[57] ABSTRACT

A panel includes metallic face sheets maintained in operative relationship with each other by a metallic core structure. The core structure consists of a plurality of securement core strips which may be internested or juxtaposed to provide a honeycomb core configuration. Structural integrity is created by the provision of internally generated welds which fasten securement portions of the core strips in operative relationship with the face sheets, but which can be terminated inwardly of the outer surfaces of the face sheets resulting in a very small volume of face sheet material being cast into a weld nugget and being heat affected and maintaining the integrity of the face sheets while, nevertheless, providing maximum structural strength and eliminating face sheet thickness limitations.

Also disclosed is a method of fabricating the metallic panel which includes the steps of internally generating the weldments so that, by minimum pressure and minimum energy, discrete welds are formed which fasten the securement portions of the core strips in operative relationship with the face sheets while greatly reducing the dimensions of the weld nuggets in comparison with the nuggets which result from the utilization of prior art external welding techinques.

5 Claims, 10 Drawing Figures

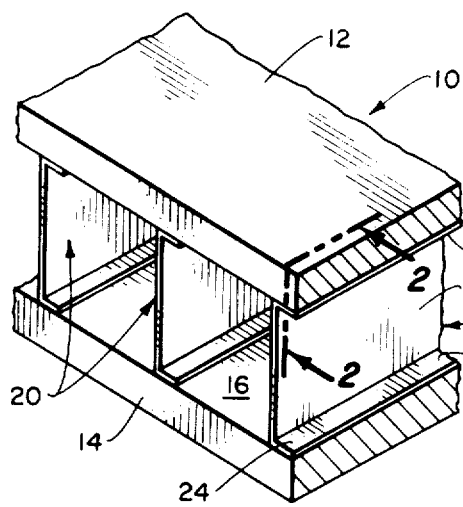
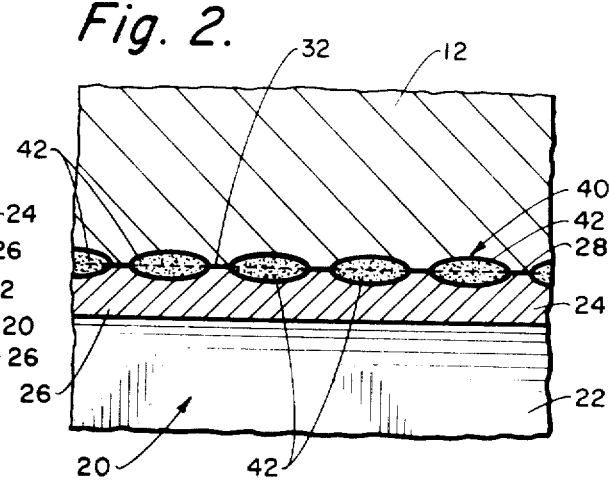
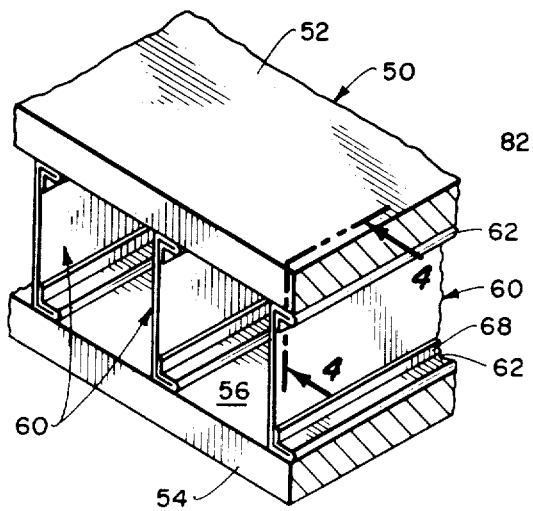
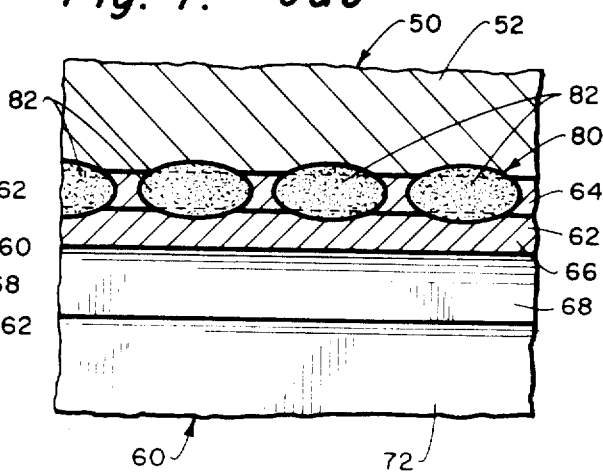
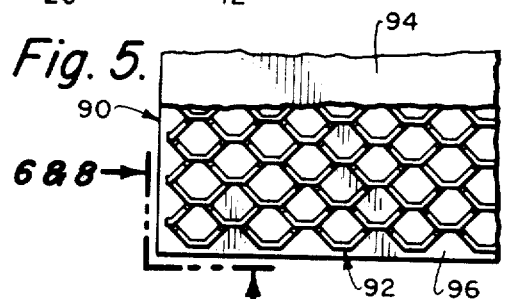

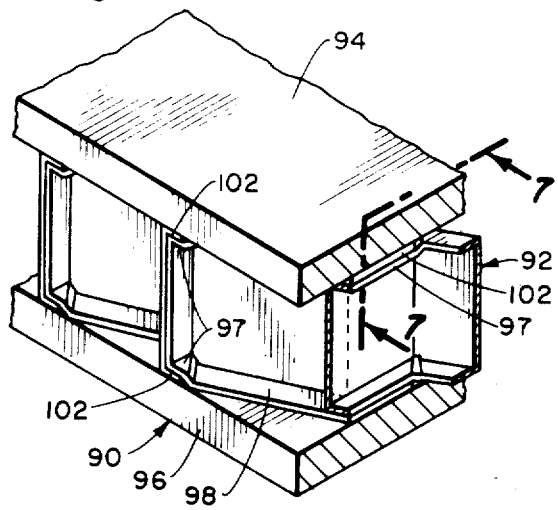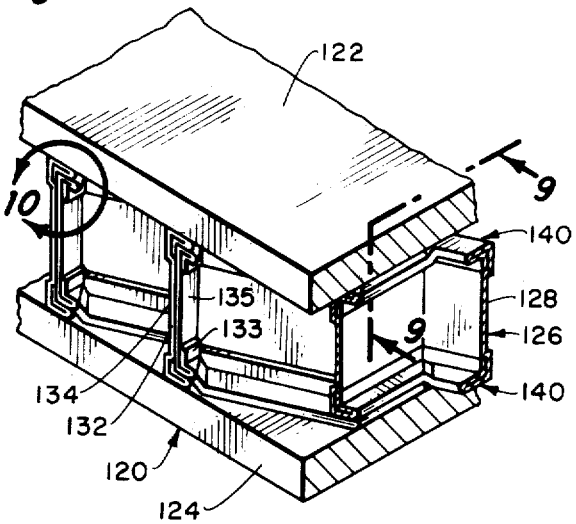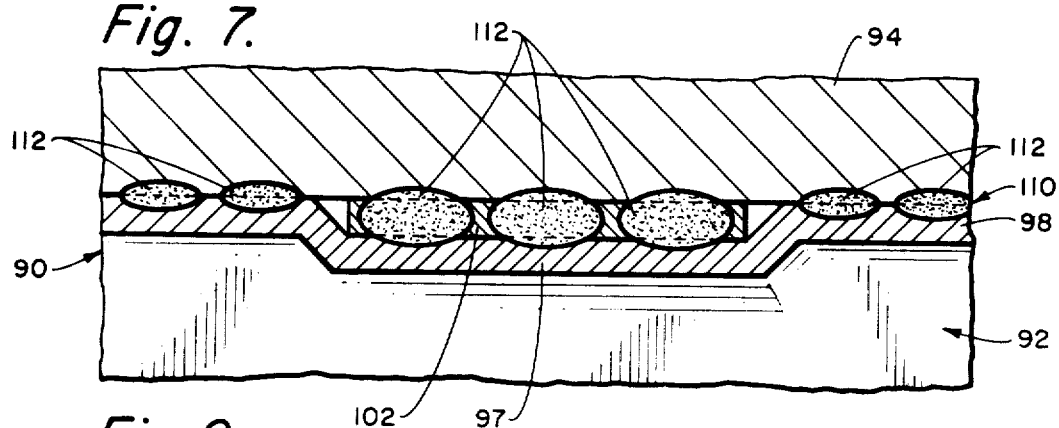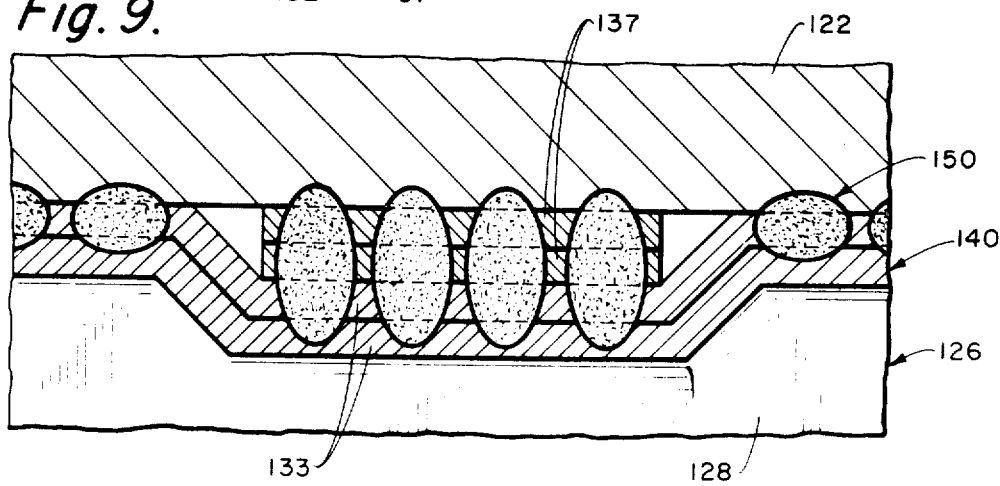

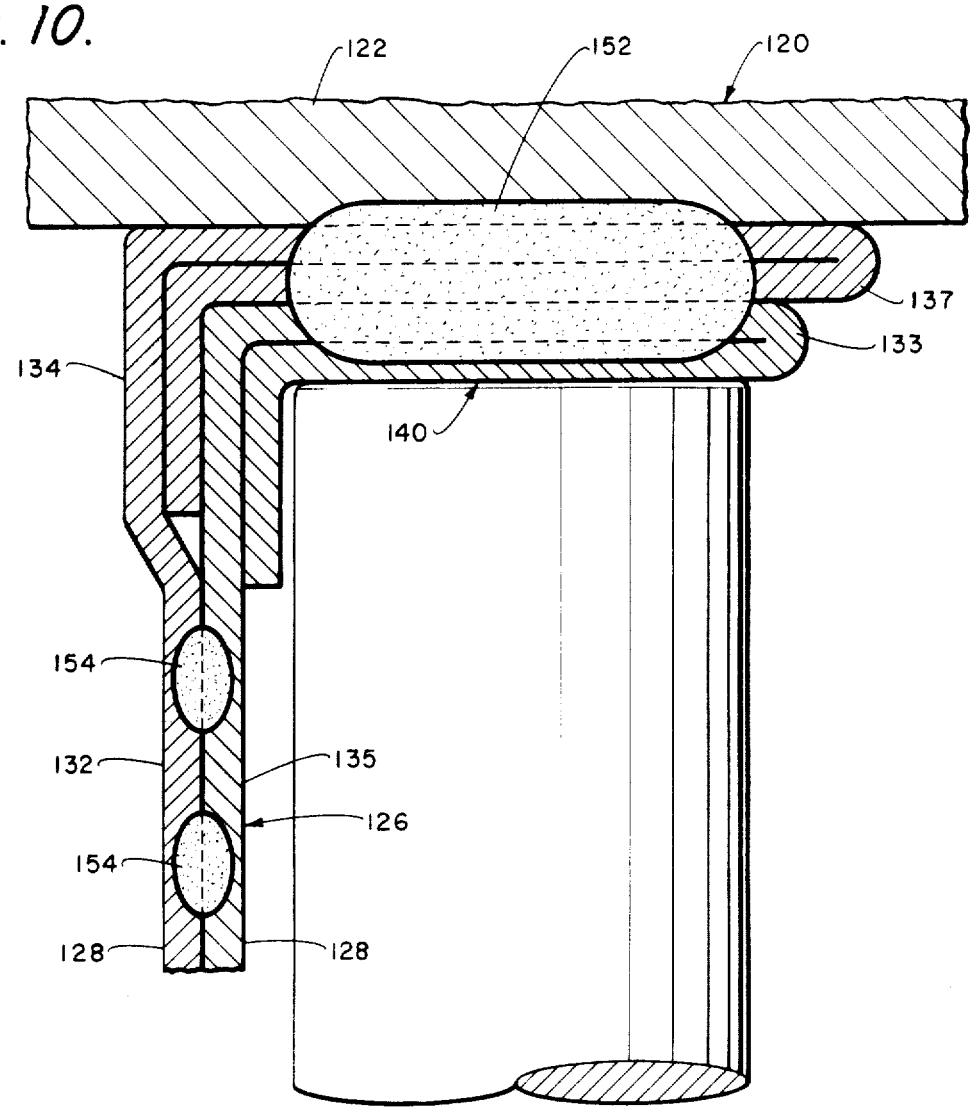

METALLIC CORE PANEL AND METHOD OF MAKING SAME

This is a division of application Ser. No. 948,012 filed Oct. 2, 1978, now U.S. Pat. No. 4,254,188.

BACKGROUND OF THE INVENTION

One of the major problems that has confronted the art in the fabrication of metallic core panels wherein the securement core strips are provided with securement portions constituted by flanges or tabs on the opposite edges of the core strip webs, is the excessive heat generated during the welding process and the resultant disproportionate size of the weld nugget which is created in the face sheets of the panel.

In other words, prior art techniques have necessitated the generation of nuggets whose size is excessive in terms of achieving structural integrity between the face sheets and the honeycomb core structure.

One of the methods previously developed by Campbell and disclosed in the patents enumerated hereinbelow resulted in a completely welded honeycomb core panel which constituted a significant advance over the prior art in that the feasibility of providing a completely welded panel was demonstrated in the art for the first time. The resultant product has achieved considerable commercial success in applications where high sonic fatigue, high temperatures and high buckling loads have prevented successful utilization of the prior art adhesively secured honeycomb-type panels wherein the structural integrity of the panels is achieved by the use of brazing or resinous adhesives.

However, the continuing demands of sophisticated aero-space technology have necessitated confrontation of the problems of excessive weld nugget size and the degradation of the face sheets which are entailed by the generation of weld nuggets whose dimensions are far in excess of those necessitated to achieve the structural integrity of the resultant honeycomb panel.

In fabricating the structures developed by Campbell and utilizing the related methods and apparatus all disclosed in the patents whose numbers appear hereinbelow, we have applied the techniques largely to various stainless steels, such as Inco 718, 316, 347, Inco 625, etc., and titanium.

We have found that the practice of the methods and utilization of the apparatus of Campbell's prior inventions, while achieving the aforementioned structural integrity of the various elements of the metallic, honeycomb core panel, does result in undesirable degradation of the structural characteristics of the face sheets in that the unnecessarily large weld nuggets, because of their external generation, cause degradation of the surfaces of the face sheets and result in the creation of stress risers which reduce the ideal structural characteristics which should be obtained if the large weld nugget size and surface degradation of the face sheets and stress risers could be eliminated.

The aforementioned problems have resulted, in part, from the use of externally positioned welding wheels which apply a translatable weld potential across the face sheets and core flanges to a serrated electrode bar. Since the electrode bar is in contact with the entire length of the core strips, welding current leakage to zones other than those being welded occurs generating excessive heat in the face sheets in order to develop sufficient heat in the internally located securement core strip flanges or tabs to establish structural integrity between said flanges and tabs and the face sheets themselves.

Because of the aforementioned excessively large contact areas of the welding wheels and the leakage and bleeding across the face sheets, excessive current magnitudes are entailed, requiring consequent high pressures between the welding wheels and the internally located projection welding bar, which, in turn, tend to entail the utilization of still higher current magnitudes. Our investigations have indicated that there is an optimum band of current and pressure which will provide a weldment whose nugget dimension eliminates all of the problems alluded to hereinabove.

The methods of the prior art, and the steps followed in performing the same, result not only in face sheet degradation of a large order of magnitude, but in sporadic inadequate welds, burns and melts. Conversely, if the welding current is too low and the pressure too high, no weld will result.

Even when optimum performance of prior art methods and apparatus is achieved where external welding wheels and internal projection electrode bars are utilized, the electrode bars deteriorate rapidly due to the excessive heat and pressure and it has been found that projection-type electrode bars must be replaced after the weldment of approximately 300 to 1000 securement core strips fabricated from easily weldable material.

Added to the cost of replacing the electrode bars themselves are the economic losses inherent in the labor expended in removal and replacement of the electrode bars and contingent upon the machine down-time occasioned while the electrode bars are being replaced in the welding apparatus. The cost of replacing the bars themselves is a major expense.

Another defect of the prior art is the gradual diminishment of weld quality due to the rapid attrition of the projections on the electrode bar, since typical pressures on the projections are approximately 20,000 to 24,000 pounds per square inch. In addition, typical currents are 4000 plus peak amps. This creates indentations on the inner surface of the face sheets and the attendant stress risers in both core flange and face sheets.

Admittedly, satisfactory metallic panels having core structures welded in accordance with the above techniques have been and are being manufactured, but the elimination of the problems mentioned hereinabove results in panels having greater structural integrity which permits use of higher allowables in design.

This is because the utilization of welding wheels conjunction with projection-type electrode bars in the welding process creates welding nuggets whose volume can be as much as fifty times greater than actually needed to structurally integrate the securement portions of the securement core strips to the face sheets with maximum efficiency.

The wheel-projection electrode bar welding concept are disclosed in Campbell U.S. Pat. Nos. 2,930,882; 3,015,715; 3,077,532, 3,498,953 and 3,689,730.

OBJECTS AND ADVANTAGES OF THE INVENTION

A primary object of our invention is the provision of a metallic reinforced panel including face sheets and a metallic core structure consisting of a plurality of securement core strips having securement portions, flanges or tabs on the opposite edges thereof wherein a continuous series of weldments generated interiorly of the panel during the course of assembly of core and face sheets affixes the securement means constituted by the flanges or tabs in operative relationship with the face sheets.

Because the weldments are generated internally of the panel at low pressures and by the utilization of low currents, the welding nuggets are extremely small in comparison with the dimensions of the welding nuggets achieved by the methods and apparatus previously described and are characterized by localization in the region of the securement flanges or tabs so that minimal penetration of the face sheets occurs while still insuring that adequate and satisfactory adherence of the securement flanges or tabs to the internal portions of the face sheets is accomplished.

Consequently, degradation of the face sheets characteristic of the massively over-size nuggets of the prior art is eliminated, and the stress risers consequent on the massivity of the nuggets and electrode strip indentation are absent from the face sheets of the panel of our invention.

Despite the fact that the welding nuggets are substantially less than the size of the welding nuggets of the prior art, we have found that the structural strength of the joint is greater than the strength of the joint where massive nuggets are created. With the elimination of significant degradation of the wrought face sheets and securement portions, and the greater joint strength, the allowables are substantially greater—in some materials at least double—than the allowables achieved with conventional wheel-projection electrode bar welding.

Another object of our invention is the provision of a panel of the aforementioned character, wherein the utilization of series of internally generated weldments of limited size permits wide variations in the thickness of the face sheets which would not be permissible with prior art welding techniques utilizing welding wheels and projection electrode bars. Face sheet thickness may be as great as 0.15 inches or more without significant change in quality of product.

As a matter of fact, the maximum face sheet thickness utilizable with prior art methods and apparatus is approximately 0.060 inches and even face sheets of this thickness are difficult to weld and result in rapid electrode bar deterioration, welding wheel deterioration and excessive face sheet degradation.

The aforementioned deficiencies of processes utilizing welding wheels and projection electrode bars on thicker materials are attributable to the fact that the welding wheels must progressively feed a welding current through the thicker face sheets and the securement flanges or tabs to the projections on the electrode bar.

This results in the creation of a heavy surge current, welding current across two or three projections, bleed current across hundreds of inactive projections and leakage to ground, which is the normal potential of the electrode bar. This massive current flow results in an excessively large heated area resulting in face sheet degradation, electrode bar attrition and enormous current consumption. The latter is particularly important when the present energy crisis is taken into consideration.

Another object of our invention is the provision of a metallic panel of the aforementioned character wherein the external surfaces of the face sheets are completely free of the wheel tracks and other indicia of the utilization of the welding methods and apparatus of the prior art. Frequently, the wheel tracks are accompanied by minute pin holes which result from the exiting of gases generated during the welding process, and the wheel tracks and pin holes constitute degradation of the surfaces of the face sheets which prevents the achievement of the structural integrity characteristic of the panel of our invention.

A further object of our invention is the provision of a panel of the aforementioned character wherein the securement core strips may be arranged in patterns other than the honeycomb pattern previously adverted to, although they are secured in operative relationship with the face sheets by the internally generated series of weldments limited substantially to the penetration of the securement flanges or tabs of the securement core strips, and minimal penetration of the adjacent and contiguous areas of the internal portions of the face sheets. Examples of such alternate configurations are straight core strips, sinuous core strips, core strips which are internested to provide rectangular compartments, and the like.

Another object of our invention is the provision of a method of welding securement core strips having securement portions constituted by flanges, tabs or the like, to facing sheets, wherein the electric current creating the welding pulse is confined to generating weld nuggets of minimal dimensions internally of the securement portions of the core strip and the face sheet, said nuggets being formed in very rapid succession and with no stray currents, no bleed current, no leakage to ground and with very light pressure exerted by the welding electrodes.

Because the pressure exerted by the welding electrodes need only be sufficient to urge the securement portions of the core strips, constituted by the flanges, tabs or the like, into physical contiguity to the inner surfaces of the face sheets, there is a corresponding massive reduction in the forces which must be exerted in comparison to those necessitated by the welding wheel-projection electrode bar technique which entails the deflection of the wrought face sheets into engagement with the securement portions, flanges, tabs or the like of the core strips.

Another object of our invention is the provision of a method of the aforementioned character wherein the current required for each weld is on an order of 600–800 amperes peak instead of 3000–5000 amperes peak entailed by the utilization of the welding wheel-projection electrode bar method and apparatus.

Another object of our invention is the provision of a method of the aforementioned character which, by substantial reductions in welding currents and pressures, eliminates the shrinkage previously encountered during the weldment of core reinforced panels by prior art methods and apparatus.

Another object of our invention is the provision of a method of the aforementioned character wherein face sheets are disposed in predetermined spaced relationship and a securement core strip having securement portions constituted by flanges, tabs or the like is inserted in the cavity provided between the face sheets by internal weldment electrode means.

After the placement of the relevant core strip between the face sheets by the weldment means, the weldment means is inserted into the aforesaid cavity and caused to exert pressure upon the adjacent flanges, tabs or the like to urge them into contiguity to the inner surfaces of the face sheets. A relatively small welding pulse on the order of ¼ of the peak amperes of prior art techniques, for example, 600-800 amperes, is then impressed upon the electrode means to cause the internal generation of a series of weldments characterized by penetration of the securement flanges, tabs or the like of the core strips and relatively limited penetration of the adjacent internal areas of the surface sheets.

An additional object of our invention is the provision of a method of the aforementioned character wherein, after the welding electrodes have accomplished the internal generation of a first series of weldments in the above-described manner, lateral shift of the electrodes accomplishes the internal generation of a second series of weldments interspersed between or among the first series of weldments.

A further object of our invention is the provision of a method of the aforementioned character wherein the electrodes, which constitute the electrode means of the invention, are inherently spring-biased against the relevant weldment areas so that follow-up of the electrodes during the "melt" phase of the welding process will occur to insure optimum structural integrity of the weld between the securement portions, flanges, tabs or the like of the securement core strips and the face sheets.

Another advantage of our invention is the fact that by the utilization of the structure and method thereof, it is possible to provide face sheets of much greater thickness in reference to core thickness than has been possible by utilization of prior art teachings. This is attributable to the internal welding steps of the method and to the internal welding structure of the product.

Also significant is the fact that multi-core panel structures can be fabricated wherein additional face sheets and core structures can be superimposed and welded to one another to achieve structural elements not attainable by the use of prior art teachings.

Although we have described a panel consisting of a core and two metallic face sheets, only one face sheet need be provided in some applications such as soundproofing.

Other objects and advantages of our invention will be apparent from the following specification and the accompanying drawings.

DESCRIPTION OF THE DRAWINGS

FIG. 1 is a fragmentary, sectional view showing a metallic panel having a plurality of parallel core strips securing the face sheets of the panel in operative relationship with each other;

FIG. 2 is an enlarged, fragmentary, sectional view taken on the broken line 2—2 of FIG. 1;

FIG. 3 is a panel of the same character as FIG. 1 with a modified type of securement core strip;

FIG. 4 is a vertical, sectional view taken on the broken line 4—4 of FIG. 3;

FIG. 5 is a fragmentary, top plan view of a metallic panel incorporating a plurality of securement core strips internested with one another to form a honeycomb core configuration;

FIG. 6 is an enlarged, fragmentary view taken on the broken line 6—6 of FIG. 5;

FIG. 7 is an enlarged, fragmentary, sectional view taken on the broken line 7-7 of FIG. 6;

FIG. 8 is an enlarged, fragmentary view taken on the broken line of 6 & 8 of FIG. 5;

FIG. 9 is an enlarged, fragmentary, sectional view taken on the broken line 9—9 of FIG. 8; and FIG. 10 is an enlarged, fragmentary, sectional view taken on the broken line 10 of FIG. 8.

DESCRIPTION OF PREFERRED EMBODIMENTS OF THE INVENTION

Referring to the drawings, and particularly to FIGS. 1-5 thereof, we show various forms of metallic panel including, in the case of FIGS. 1 and 2, a metallic panel 10 including an upper face sheet 12 and a lower face sheet 14 formed from stainless steel or the like. The words "upper" and "lower" are utilized to describe the orientation of the face sheets 12 and 14 in the respective figures of the drawings but, of course, it will be obvious to those skilled in the art that the resultant panel 10 can be disposed in a variety of orientations. Furthermore, although we describe flat panels fabricated in accordance with the method of my invention hereinbelow, it will also be obvious to those skilled in the art that various configurations can be imparted to the panel without departing from the teachings of the invention.

For instance, the panels can be formed by stretch forming into various curvilinear configurations and, moreover, the height of the securement core strips can also be varied to change the thickness of the panel, if desired, or to impart a tapered configuration thereto.

Moreover, the panel is capable of being utilized in various configurations and affixed to adjoining structures by means of hardware such as that disclosed in previously issued Campbell U.S. Pat. Nos. 3,476,422 and 3,526,072.

The face sheets 12 and 14 of the panel 10 are formed from stock fed from rolls of materials by the apparatus disclosed in our co-pending application Ser. No. 2,769 filed Jan. 12, 1979, entitled Apparatus for Fabricating and Welding for Reinforced Panel, and portions of the face sheets 12 and 14 are disposed, during the practice of the method of our invention disclosed hereinbelow, in spaced relationship with each other to define a cavity 16 for the reception of securement core strips 20, said securement core strips, in the case of FIGS. 1-2, having centrally located webs 22 and securement portions 24 constituted by continuous flanges 26 formed on the upper and lower edges of the web 22.

It will be noted that there is a considerable disparity between the thickness of the core strips 20 and the face sheets 12 and 14. In certain applications the core strips are fabricated from material having a thickness of approximately 0.002 inches and the face sheets are fabricated from material of 0.05 inches. However, various thicknesses of face sheets can be utilized by manufacturing panel in accordance with our invention and by the practice of the steps of the method of our invention.

In the panel 10 of FIG. 1, the securement core strips 20 are arranged in parallelism with each other and the securement portions constituted by the continuous flanges 24 impart a channel configuration to the core strips 20.

The securement portions 24 of the core strips 20 have their outer surfaces 28 juxtaposed to the corresponding inner surfaces 32 of the face sheets and securement means 40, constituted by a continuous series of weldments 42 which are internally generated by the practice of the method of our invention, described more fully hereinbelow, maintaining the core strips in structural integration with the face sheets 12 and 14.

It will be noted from FIGS. 1 and 2 of the drawings that the weldments 42 bridge the interface between the confronting surfaces of the face sheets 12 and 14 and the flanges 26, but are of relatively small size because of their internal generation which requires, as disclosed hereinbelow, lower pressures and lower current flows than prior art methods.

Consequently, the structural integrity of the flanges and surface sheets is preserved and the degradation of the surface sheets which occurs when large weld nuggets are thrown by the use of external welding wheels and internal projection welding electrodes is eliminated.

Because of the considerably diminished size of the weldments 42, relatively large numbers of weldments may be encompassed in the continuous series 40 thereof providing significantly enhanced structural integrity between core strips 20 and face sheets 12 and 14.

Shown in FIGS. 3 and 4 are fragmentary views of an alternative form of panel 50 utilizing face sheets 52 and 54, having a void 56 therebetween in which core strips 60 are located having securement flanges 62 of somewhat different configuration from the flanges 26 of the core strips 20 of the previously discussed panel 10 of the invention.

The flanges 62 include a layer 64 of material which is folded to provide a layer 66 having a depending leg 68 overlying the web 72 of the respective strip 60. The folded over flange construction materially strengthens the core strip 60 in the area of adherence of said strip to the adjacent inner surfaces of the face sheets 52 and 54 and the folded over portions may be formed by roll forming or similar techniques as more fully described in my co-pending application Ser. No. 948,011 filed Oct. 2, 1978, entitled Core Strip Blank, Core Strip and Method of Making Same.

Once again a continuous series 80 of internally generated weldments 82 is created which not only secures the upper surface of the flanges 62 to the confronting surfaces of the face sheets 52 and 54, but structurally integrates the lower layer 66 with the upper layer 64 of the folded over flanges.

Once again, the absence or diminished number of voids and skips and the relatively miniscule size, if desired, of the weldments 82 permits a denser series of weldments to be created which greatly enhances the structural integrity of the panel 50.

A fragmentary view of a panel 90, FIG. 5, discloses the use of core strips 92 which are of substantially corrugated configuration and which are internested with one another at the nodal areas, as disclosed in Campbell U.S. Pat. No. 2,910,153. Face sheets 94 and 96 are maintained in operative relationship with one another by the core strips 92 which are internested at the nodes thereof in the manner described in the aforementioned U.S. Pat. No. 2,910,153.

When internested, the male nodes 97 on the flanges 98 fit between the female nodes 102, as best illustrated in FIGS. 6 and 7 of the drawings.

Once again, a continuous series 110 of weldments 112 is generated internally of the panel 90 causing the structural integration of the flanges 98 of the core strips 92 with the corresponding portions of the face sheets 94 and 96, and also causing the two layers of material constituted by the internested nodal areas of the core strips 92 to be welded to each other and to the corresponding portions of the face sheets 94 and 96.

Thus, the uniform and continuous series of welds which are internally generated by the method of the invention disclosed hereinbelow provide structural integrity and substantially undamaged material in the relevant portions of the core strips 92 and face sheets 94 and 96.

Another panel construction 120 is illustrated in FIGS. 8 and 9 of the drawings as including face sheets 122 and 124, and core strips 126 having webs 128 which are indented, as at 132, in the female nodal areas to provide close juxtaposition of the male nodal area webs 135 to the corresponding webs 134 of the female nodes.

The flanges 140 of the core strips 126 are folded upon themselves to provide double layers of material, as best shown in FIG. 8 and in detail in FIGS. 9 and 10. Consequently, when the male nodes 133 are received in the female nodes 137, there are five thicknesses of material juxtaposed to one another including the four thicknesses of the nodes and the single thickness of the face sheets 122 and 124.

Once again, a continuous series 150 of weldments 152 is internally generated to cause structural integration of the nodal areas of the core strips 126 with one another and with the adjacent face sheets and to also cause continuous weldment of the continuous flanges 140 to the relevant portions of the face sheets.

An enlarged, fragmentary view of the panel 120, FIG. 10 illustrates the inter-engagement of the male nodes 133 with the female nodes 137 of the core strips 126. Also illustrated in detail is the manner in which the folded over portions of the flanges 140 are created, and the manner in which the weldments 152 secure the four layers of flange and the relevant portions of the face sheets 122 and 124 in structural relationship with one another.

It is also desirable on many occasions for the nodal portions of the webs 128 of the core strips 126 to be welded to one another by means of weldments 154 and this node welding step will be described during the description of the method of our invention appearing hereinbelow.

Although we have disclosed, in the previously discussed embodiments of the panel of our invention the use of securement core strips having continuous flanges, it will be apparent to those skilled in the art that the use of core strips having notches or openings in the flanges is also feasible.

In our co-pending application, Ser. No. 948,011, filed Oct. 2, 1978, entitled Core Strip Blank, Core Strip and Method of Making Same, we have disclosed the use and fabrication of core strips having openings in the flanges thereof and have also disclosed various methods of manufacturing the same.

DESCRIPTION OF THE METHOD OF THE INVENTION

The method of the invention can be performed by the use of hand-held welding electrodes, but it would be an extremely tedious and time-consuming task to achieve the steps of the method in that manner, and reference is made to our co-pending application, Ser. No. 2,769 filed Jan. 12, 1979, entitled Apparatus for Fabricating and Welding for Reinforced Panel for a disclosure of an automated apparatus for practicing the steps of the method.

The primary step of the method entails the location of portions of face sheets, such as the face sheets 12 and 14 of FIG. 1, in predetermined, spaced relationship with one another. For instance, as they are unreeled from a roll of sheet material, the face sheets can be maintained in the predetermined spatial relationship by means of suitable fixtures engaging and spacing the confronting surfaces internally thereof.

Subsequently, the core strips, such as the core strips 20, are inserted successively into the void created by the spaced relationship of the face sheets 12 and 14.

During the welding step, electrode means constituted by a plurality of electrode fingers of as small a cross-section as possible is inserted into the void between the face sheets 12 and 14 and the welding tips thereof are juxtaposed to the corresponding surfaces of the flanges 24 of the core strips 20.

The electrode fingers and, more particularly, the welding tips thereof are urged against the corresponding surfaces of the flanges 24 of the core strip 20 to cause the flanges to be moved into optimum engagement with the corresponding surfaces of the inner surfaces of the face sheets 12 and 14. Because the mass of metal which is being moved by the welding fingers is relatively small, low forces on the order of about 2 to 6 pounds, for example, are satisfactory and the excessively high pressures resulting from welding wheel forces of perhaps 500 pounds which must be utilized in the prior art welding wheel-projection electrode bar apparatus and method are obviated.

It is desirable that, after the electrode welding tips are moved into engagement with the flanges, a certain amount of residual spring be inherent in the electrode fingers for a purpose to be described in greater detail below.

After the relatively light pressure is exerted on the flanges by the welding electrodes, the individual electrode fingers are subjected to the relatively low amperage welding currents on the order of, for example, 600 to 800 amperes peak and the impression of this current occurs seriatim at very high speeds across the individual fingers. The rapid pulsing of the welding current can be achieved by the utilization of conventional welding circuitry and welding transformers, and the high-speed operation of the welding transformers can be accomplished by solid state controls or by the utilization of high-speed, mechanical, commutator means.

Because of the relatively low current, relatively small weldments may be made in close proximity to one another, and the weldments are so small that little degradation of the flanges or the surface sheets occurs. There are no burns, holes or massive nuggets which prevent the close juxtaposition of the weldments of a series to one another. If, for some reason, higher currents are desired, they may be used.

Although we have attempted to use the thinnest electrode fingers feasible, we have found that spaces still will exist between the smallest weldments and to accomplish interstitial welding, we have found it desirable to shift the electrode means out of phase into positions in which the electrode fingers can be interposed between previously created welds to insure that a continuous series of welds will be accomplished.

Consequently, the high pressures on the order of 24,000 psi per electrode projection and high amperage currents of 2000 to 5000 amperes peak are eliminated in the use of the present method in contrast with the prior art welding wheel-projection electrode bar method.

After the flange welding has been accomplished, node welding electrode means may be inserted into contiguity to the nodes of the internested core strips where a honeycomb core pattern is desired. Of course, where straight core strips are used, as in the case of the panels like that of FIG. 1, no node welding step takes place.

It was previously mentioned that residual springiness is provided in the flange electrode fingers after initial displacement of the flanges into engagement with the relevant portions of the interior surfaces of the face sheets. This is necessary so that the welding tips may follow the weld during the melt phase to insure substantial integrity of each weldment as it is formed. If the inherent springiness were not permitted to reside in the welding fingers, there would be a possibility that the minute gap caused by the welding melt might prevent completion of a proper weld nugget.

Consequently, we have achieved the most efficient weld between the flanges of the very thin foil core elements and the facing sheets, which are many times thicker, by focusing the welding energy creating the weldment onto the surface of the foil core elements only in the very small zone where an individual weld is to be created.

Therefore, the area of energy input is precisely controlled; the pressure of the energy input means against the core member is carefully calculated and controlled; and the energy input means and the pressuring means for the same are of low mass and substantial resiliency so as to provide a "follow through" action in the small time that the energy burst produces the weld and the softening metal tends to move away from the welding electrode.

Typical bursts or pulse times are one to three milliseconds, that is, 0.001 to 0.003 seconds, for example. In the approximate last one-half of the pulse time, the electrode tip follows the softening metal by perhaps 0.001 to 0.0025 inches, so as to maintain good electrical contact during this transition and to provide good chill effect on the heated metal instantaneously upon the termination of the energy pulse by acting as a heat sink. The internal welding electrodes for use on 0.002 to 0.003 core having a cell size in the range of 0.25 inches to 0.625 inches will accelerate under a 3 pound force at a rate that provides a travel of 0.005 inches in about one-sixth of a millisecond.

Because of the carefully delineated and restricted size of the energy input area and the relatively light pressure utilized, none of the pulse energy is bled off by extraneous current paths, and the controlled pulse from the power supply flows in a restricted path through the area of energy input.

During the welding steps, the panel being fabricated is externally grounded by engagement with conductive portions of the welding circuit, such as face sheet guides, on an automated machine.

The gage of the core strip blank can range from about 0.002 inches upwardly while the face sheets can be of any desired thickness due to the fact that the welding steps are accomplished internally of the panel and large thicknesses have no significant effect on the weld.

Because of the internal welding method, it is possible to increase the current so that the welding nuggets will penetrate the surface sheets to permit additional structures or sheets to be welded in overlying relationship with the surface sheets. This can be accomplished by increasing the amperage on the welding electrodes or, if necessary, increasing the size of the welding electrodes. Therefore, the internal welding method provides control of the welding nugget size which will, if desired, eliminate the penetration of the nugget to the external surfaces of the face sheets but will, alternatively, permit the complete penetration of the face sheets and cause the nugget to create a weld to secure objects positioned externally of the face sheets thereto.

In addition, the utilization of the internal welding method permits the welding amperages in order to achieve the results referred to hereinabove including the creation of panels with no external indication of the welding pattern on the surfaces of the face sheets or, conversely, with complete penetration of the face sheets to weld objects externally thereof.

I claim:

1. In a metallic, core reinforced panel, the combination of: first and second face sheets disposed in spaced relationship with each other to define a cavity between the confronting inner surfaces thereof; a core structure disposed in said cavity and secured to said face sheets by a plurality of weldments; and an additional metallic element secured to the external surface of one of said face sheets by said weldments.

2. In a metallic panel, the combination of: a first face sheet disposed in confronting relationship with a second face sheet to define a core receiving cavity therebetween; a core structure located in said cavity, said core structure having securement portions thereupon juxtaposed to the confronting inner surfaces of said face sheets; a series of weldments securing said securement portions of said core structure and said face sheets in operative relationship with one another; and an additional metallic element secured in overlying relationship with at least one of said face sheets by said weldments, said weldments penetrating said securement portions, said respective one of said face sheets and said additional metallic element.

3. In a metallic panel structure, the combination of: first and second face sheets disposed in spaced relationship with each other to define a cavity therebetween; a core structure having securement portions thereupon disposed in said cavity and having said securement portions juxtaposed to the inner surfaces of said face sheets; a series of weldments securing said securement portions of said core structure in operative engagement with said face sheets; and a second core structure secured by said weldments in overlying relationship with at least one of the said face sheets.

4. In a method of fabricating a composite metallic panel, the steps of: disposing first and second face sheets in spaced relationship with each other to define a cavity therebetween; placing a core structure in said cavity, said core structure having securement portions juxtaposed to the inner surfaces of said face sheets; disposing an additional metallic element in overlying relationship with at least one of said face sheets; and simultaneously welding said securement portions to said face sheets and said additional metallic element in overlying relationship with said one of said face sheets.

5. In a method of fabricating a composite metallic panel, the steps of: placing two face sheets in confronting, spaced relationship with each other to define a cavity therebetween; placing a core structure in said cavity, said core structure having securement portions thereupon juxtaposed to the inner surfaces of said face sheets; welding said securement portions of said core structure to said inner surfaces of said face sheets; placing a second core structure in overlying relationship with at least one of said face sheets; juxtaposing a third surface sheet in overlying relationship with said second core structure; and welding said core structure internally to said one of said face sheets and said third face sheet.

* * * * *